(12) United States Patent
Hilgers

(10) Patent No.: US 7,750,864 B2
(45) Date of Patent: Jul. 6, 2010

(54) RFID TAG HAVING A FOLDED DIPOLE

(75) Inventor: Achim Hilgers, Alsdorf (DE)

(73) Assignee: NXP B.V., Eindhoven (NL)

( * ) Notice: Subject to any disclaimer, the term of this patent is extended or adjusted under 35 U.S.C. 154(b) by 24 days.

(21) Appl. No.: 11/574,237

(22) PCT Filed: Aug. 16, 2005

(86) PCT No.: PCT/IB2005/052700

§ 371 (c)(1),
(2), (4) Date: Oct. 12, 2007

(87) PCT Pub. No.: WO2006/021914

PCT Pub. Date: Mar. 2, 2006

(65) Prior Publication Data

US 2008/0186245 A1 Aug. 7, 2008

(30) Foreign Application Priority Data

Aug. 26, 2004 (EP) .................................. 04104098

(51) Int. Cl.
*H01Q 9/26* (2006.01)
(52) U.S. Cl. .................. 343/803; 343/793; 343/700 MS
(58) Field of Classification Search .................. 343/793, 343/803, 700 MS
See application file for complete search history.

(56) References Cited

U.S. PATENT DOCUMENTS

| 5,508,710 | A | * | 4/1996 | Wang et al. | 343/726 |
| 6,147,606 | A | * | 11/2000 | Duan | 340/572.7 |
| 6,265,977 | B1 | * | 7/2001 | Vega et al. | 340/572.7 |
| 6,404,339 | B1 | * | 6/2002 | Eberhardt | 340/572.1 |
| 2005/0093678 | A1 | * | 5/2005 | Forster et al. | 340/10.1 |

* cited by examiner

*Primary Examiner*—Douglas W Owens
*Assistant Examiner*—Dieu Hien T Duong

(57) ABSTRACT

A circuit array, comprising a substrate, and comprising an electrically conducting folded dipole antenna arranged on and/or in the substrate, the folded dipole antenna having a first antenna connection and having a second antenna connection, and wherein the folded dipole antenna has a disconnected portion dividing the folded dipole antenna in a first antenna portion and in a second antenna portion such that a capacity is formed at the disconnected portion between the first antenna portion and the second antenna portion. An integrated circuit can be or is arranged on the substrate, the integrated circuit having a first integrated circuit connection connected to the first antenna connection and having a second integrated circuit connection connected to the second antenna connection.

21 Claims, 6 Drawing Sheets

RFID TAG HAVING A FOLDED DIPOLE

FIELD OF THE INVENTION

The invention relates to a circuit array.

The invention further relates to a method of manufacturing a circuit array.

BACKGROUND OF THE INVENTION

The importance of automatic identification systems increases particularly in the service sector, in the field of logistics, in the field of commerce and in the field of industrial production. Thus, automatic identification systems are implemented more and more in these and other fields and will probably substitute barcode systems in the future. Further applications of identification systems are related to the identification of persons and animals.

In particular contactless identification systems like transponder systems, for instance, are suitable for a wireless transmission of data in a fast manner and without cable connections that may be disturbing. Such systems use the emission and absorption of electromagnetic waves, particularly in the high frequency domain. Systems having an operation frequency below approximately 800 MHz are frequently based on an inductive coupling of coils, which are brought in a resonance state by means of capacitors, and which are thus only suitable for a communication across small distances of up to one meter.

Due to physical boundary conditions, transponder systems having an operation frequency of 800 MHz and more are particularly suitable for a data transfer across a distance of some meters. These systems are the so-called RFID-systems ("radio frequency identification"). Two types of RFID-systems are distinguished, namely active RFID-systems (having their own power supply device included, for example a battery) and passive RFID-systems (in which the power supply is realized on the basis of electromagnetic waves absorbed by an antenna, wherein a resulting alternating current in the antenna is rectified by a rectifying sub-circuit included in the RFID-system to generate a direct current). Moreover, semi-active (semi-passive) systems which are passively activated and in which a battery is used on demand (e.g. for transmitting data) are available.

A transponder or RFID tag comprises a semiconductor chip (having an integrated circuit) in which data may be programmed and rewritten, and a high frequency antenna matched to an operation frequency band used (for example a frequency band of 902 MHz to 928 MHz in the United States, a frequency band of 863 MHz to 968 MHz in Europe, or the ISM-bands ("industrial scientific medical"), for instance 2.4 GHz to 2.83 GHz). Besides the RFID tag, an RFID-system comprises a reading device and a system antenna enabling a bi-directional wireless data communication between the RFID tag and the reading device. Additionally, an input/output device (e.g. a computer) may be used to control the reader device.

The semiconductor chip (IC, integrated circuit) is directly coupled (e.g. by wire-bonding, flip-chip packaging) or mounted as a SMD ("surface mounted device") device (e.g. TSSOP cases, "thin shrink small outline package") to a high frequency antenna. The semiconductor chip and the high frequency antenna are provided on a carrier substrate that may be made of plastics material. The system may also be manufactured on a printed circuit board (PCB).

In order to increase the efficiency of such a transponder, an efficient antenna should be used. Further, the reflection of energy between the antenna and the semiconductor chip should be as low as possible. This may be accomplished by matching the electromagnetic properties of the semiconductor chip and the electromagnetic properties of the antenna. A maximum amount of power may be transmitted, if the value of the impedance of the semiconductor chip $\underline{Z}_{chip}$ is complex conjugate to the value of the impedance of the antenna $\underline{Z}_{antenna}$.

$$\underline{Z}_{chip} = \underline{Z}^*_{antenna} \tag{1}$$

$$R_{chip} + jX_{chip} = R_{antenna} - jX_{antenna} \tag{2}$$

In equation (2), $R_{chip}$ denotes the ohmic resistance of the semiconductor chip, j is the imaginary number, and $X_{chip}$ is the (inductive and capacitive) reactance of the semiconductor chip. $R_{antenna}$ is denoted the ohmic resistance of the antenna, and $X_{antenna}$ is the (inductive and capacitive) reactance of the antenna.

As can be seen from equations (1) and (2), for an appropriate impedance matching, the absolute values of the real parts of the complex impedances of the semiconductor chip and of the antenna should be equal, and the absolute values of the imaginary parts of the complex impedances should be identical, wherein the reactance of the semiconductor chip should be complex conjugate to the reactance of the antenna.

According to the manufacturing process of a semiconductor chip, the impedance of a semiconductor chip is usually dominated by the capacitive contribution, i.e. the imaginary part $X_{chip}$ is usually negative. Consequently, for an efficient transponder antenna design, the reactance of the antenna should be dominated by the inductive contribution, i.e. the reactance $X_{antenna}$ should be positive, and its absolute value should be equal to the imaginary part of the impedance of the semiconductor chip. If this is the case, and if the condition is fulfilled that the two real parts $R_{chip}$ and $R_{antenna}$ are equal, then an efficient power matching is realized and a high energy transfer between the semiconductor chip and the antenna can be obtained. Thus, for an efficient antenna design, the real part and the imaginary part of the impedance of the antenna should be matched to a given impedance of a semiconductor chip.

U.S. Pat. No. 6,097,347 and U.S. Pat. No. 6,028,564, each disclose to provide one or more stubs in a conventional linear dipole antenna of a radio frequency tag to adjust the imaginary part of the antenna input impedance. Further one or more loading bars are placed adjacent to elements of the antenna at a spacing distance, wherein a real part of the antenna input impedance is changed by adjusting the loading bars. Thus, U.S. Pat. No. 6,097,347 and U.S. Pat. No. 6,028,564 each disclose a procedure (possibility) to match the impedance of a conventional dipole antenna by providing additional elements, whereby the costs for producing the radio frequency are increased. U.S. Pat. No. 6,100,840 and U.S. Pat. No. 6,140,146 disclose similar concepts.

Further, U.S. Pat. No. 5,528,222 discloses a radio frequency tag having a semiconductor circuit connected to a folded dipole antenna.

However, the radio frequency tag according to U.S. Pat. No. 5,528,222 has the disadvantage that the folded dipole antenna forms a short circuit for a direct current flowing in the folded dipole antenna. In case that a rectifying unit is arranged in such a semiconductor chip for providing a direct voltage as a power supply for integrated circuit elements of the semiconductor chip, the radio frequency tag of U.S. Pat. No. 5,528,222 suffers from the disadvantage that the generation of a direct current or voltage is negatively influenced by the fact that the two connections of the semiconductor chip are short circuited for any direct current flowing in the antenna. Therefore, a passive radio frequency tag having a folded dipole antenna does not reliably provide integrated circuit elements of a semiconductor chip with sufficient direct current power.

OBJECT AND SUMMARY OF THE INVENTION

It is an object of the invention to provide a transponder on the basis of a folded dipole antenna, wherein the power supply of the transponder is realized in a reliable manner.

In order to achieve the object defined above, a circuit array and a method of manufacturing a circuit array according to the independent claims are provided.

The circuit array of the invention comprises a substrate and an electrically conducting folded dipole antenna arranged on and/or in the substrate, the folded dipole antenna having a first antenna connection and having a second antenna connection. The folded dipole antenna has a disconnected portion dividing the folded dipole antenna in a first antenna portion and in a second antenna portion such that a capacity is formed at the disconnected portion between the first antenna portion and the second antenna portion.

Moreover, the invention provides a method of manufacturing a circuit array, wherein the method comprises the steps of forming an electrically conducting folded dipole antenna on and/or in a substrate, the folded dipole antenna is formed to have a first antenna connection and to have a second antenna connection. The folded dipole antenna is formed to have a disconnected portion dividing the folded dipole antenna in a first antenna portion and in a second antenna portion such that a capacity is formed at the disconnected portion between the first antenna portion and the second antenna portion.

The characteristic features according to the invention particularly have the advantage that the folded dipole antenna is mechanically disconnected to ohmically decouple a first antenna portion from a second antenna portion, i.e. to prevent a direct current from flowing from the first antenna portion to the second antenna portion, by disconnecting the antenna structure. Thus, a capacity is formed at the interruption of the folded dipole antenna. Such an interruption has the effect that a direct current short circuit is avoided between the first antenna connection and the second antenna connection. The first antenna connection and the second antenna connection of the folded dipole antenna are preferably configured such that a first integrated circuit connection of an integrated circuit (which may be arranged on and/or in the substrate) is connectable to the first antenna connection, and that a second integrated circuit connection is connectable to the second antenna connection. Therefore, it is prevented—by a capacity formed in the folded dipole antenna—that a direct current can flow between the two connections between which an integrated circuit may be provided. By taking this measure, a rectifying sub-circuit (which is frequently included in such an integrated circuit for rectifying an alternating voltage to generate a direct voltage as a power supply for integrated circuit elements) is enabled to operate in an efficient manner, since it is avoided that two connections of such a rectifying circuit are brought to the same electrical potential. According to the invention an electrically conducting structure constituting the folded dipole antenna is divided mechanically into two separate antenna portions, such that adjoining parts of the first antenna portion and of the second antenna portion form a capacity. The disconnected portion cannot be passed by a direct current. However, the disconnected portion almost forms a short circuit for a high frequency voltage, thus allowing the interrupted dipole antenna to fulfil its antenna functionality.

The circuit array of the invention may also be denoted as a transponder device, and may be advantageously realized as a passive (or a semi-passive or a semi-active) radio frequency tag.

The provision of a folded dipole antenna with a capacity integrated therein allows to be manufactured with very small dimensions. Thus, the circuit array can be manufactured with low costs and is therefore suitable as a competitive RFID tag.

A frame condition for many integrated circuits to be implemented in a (passive) transponder is that a direct current short circuit is not allowed for the antenna of such a transponder. This applies particularly for an integrated circuit having a rectifier sub-circuit as a DC power supply. The reason why such a DC short circuit is not allowed is the architecture of integrated circuits which frequently comprise a rectifying sub-circuit in the input portion of the chip in order to provide a DC voltage supply of integrated circuit components (e.g. a memory sub-circuit). The functionality of the circuit array of the invention is very rugged against any distortions caused by an insufficient internal power supply. Thus, the invention overcomes the problem of a DC voltage short circuit of a folded dipole antenna.

The disconnected portion between the two antenna portions facing each other with a surface area A and being separated by a distance d in which a dielectric having a permittivity $\epsilon_0 \epsilon_r$ may be provided, forms a capacity C, as can be seen from equation (3):

$$C = \epsilon_0 \epsilon_r A/d \qquad (3)$$

Referring to the dependent claims, further preferred embodiments of the invention will be described in the following.

Next, preferred embodiments of the circuit array of the invention will be described. These embodiments may also be applied for the method of manufacturing the circuit array.

The circuit array may comprise dielectric material between the first antenna portion and the second antenna portion. By taking this measure, the value of the capacity formed at the disconnected portion between the first antenna portion and the second antenna is increased, thus improving the capacitive coupling of the device. The dielectric material may be a high-k material (e.g. aluminium oxide, $Al_2O_3$), i.e. a material with a high value of the electrical permittivity. The dielectric material may also be a ferroelectric material or a semi-conducting material, i.e. a material with an electrical conductivity that is less than a metallic conductivity.

The circuit array of the invention may comprise a capacitor device arranged in the disconnected portion, the capacitor device having a first capacitor connection connected to the first antenna portion and having a second capacitor connection connected to the second antenna portion. In other words, a capacitor member like an SMD capacitor ("surface mounted device") may be provided as a separate element included in the disconnected portion. By providing a separate element for forming the capacitor, the value of the capacity can be adjusted to a desired value with high accuracy.

The capacity may be formed in a portion in which the first antenna portion overlaps the second antenna portion being arranged at a distance from one another. By providing the first and the second antenna portions in an overlapping manner, the area A of the capacitor forming the capacity C is increased, as can be seen from equation (3).

Particularly, the first antenna portion may overlap the second antenna portion such that the disconnected portion is located above an overlapping part of the first antenna portion and below an overlapping part of the second antenna portion. According to the described embodiment, a vertical stack of layers is arranged in and/or on the substrate in the overlapping portion (area A), wherein an intermediate layer between the overlapping part of the first antenna portion and the overlapping part of the second antenna portion may be made of a material with a sufficiently high value of the relative permittivity $\in_r$. This yields an increase of the value C—see equation (1). A further increase of the value of C is accomplished by forming the intermediate layer such that it has a sufficiently small thickness d.

Alternatively to the described embodiment, the first antenna portion may overlap the second antenna portion in a plane parallel to a main surface of the substrate. The main surface of the substrate may be defined as the surface of the substrate at which or in which the folded dipole antenna and the integrated circuit are provided. Particularly, the disconnected portion may essential have the shape of a straight line or of a non-straight line like a meander, a spiral or the like. Any other geometric shape of the disconnected portion is possible. The larger the length of the disconnected portion, the higher is the resulting capacity, the better is the capacitive coupling (compare equation (3)).

A meander-like structure can be obtained by providing the first antenna portion and the second antenna portion as an interdigitated structure, e.g. each having finger-shaped substructures interlocking each other. A spiral-shaped disconnected portion may be realized by providing end portions of the first antenna portion and the second antenna portion with a spiral shape, wherein the two spirals thus created are embedded within each other.

Further, the circuit array of the invention may have a floating structure made of an electrically conducting material arranged above or below the disconnected portion. The capacitive coupling can be modified, particularly enhanced, in case that a floating metallization structure is provided in the vicinity of the capacitive coupling region, i.e. in the vicinity of the disconnected portion. "Floating" in this context means that the floating structure is not brought to a defined electrical potential, but is electrically isolated against its environment such that its electrical potential freely floats.

The disconnected portion may be provided at a position of the folded dipole antenna such that the first antenna portion is arranged symmetrically to the second antenna portion. Such a symmetric configuration particularly simplifies an impedance matching, i.e. a matching of the impedance of the integrated circuit to the impedance of the folded dipole antenna to optimize the energy transfer between the integrated circuit and the folded dipole antenna.

The circuit array preferably comprises an integrated circuit arranged on and/or in the substrate, the integrated circuit having a first integrated circuit connection connected to the first antenna connection and having a second integrated circuit connection connected to the second antenna connection.

The integrated circuit of the circuit array may comprise a rectifier sub-circuit adapted and connected such that the rectifier sub-circuit rectifies an alternating voltage provided in the folded dipole antenna to generate a direct voltage. When using the circuit array of the invention as a transponder electromagnetic waves may be received by the folded dipole antenna. Such absorbed electromagnetic waves generate an alternating current in the coil-like antenna. Such an alternating current in the folded dipole antenna may be used as a source of electrical energy for driving integrated circuit elements in the integrated circuit (e.g. a memory, a processing means, etc.). However, such integrated circuit elements usually require a DC voltage to be driven. Thus, the rectifier sub-circuit may convert the alternating voltage absorbed by the antenna into a direct voltage.

The first antenna portion of the circuit array may be provided essentially U-shaped, and the second antenna portion may also be provided essentially U-shaped. The two U-shaped antenna portions may be assembled such that the open portions of the U-shaped structures are adjacent to one another, thereby forming a ring-like folded dipole antenna.

According to a further preferred embodiment of the invention, the circuit array of the invention may have the first antenna portion comprising a first leg piece and a second leg piece and one link piece, wherein the first leg piece is connected to the second leg piece by the link piece, wherein the first leg piece is further connected to the first integrated circuit connection. Moreover, the second antenna portion may comprise a first leg piece and a second leg piece and one link piece, wherein the first leg piece is connected to the second leg piece by the link piece, wherein the first leg piece is further connected to the second integrated circuit connection. The second leg piece of the first antenna portion may be separated from the second leg piece of the second antenna portion by the disconnected portion.

Preferably, the first and second leg pieces of the first and second antenna portions are essentially aligned in a first direction being perpendicular to a second direction along which the link pieces of the first and second antenna portions are essentially aligned.

Preferably, the material and/or the dimensions of the folded dipole antenna is/are configured such that the value of the impedance of the folded dipole antenna essentially equals to the complex conjugate of the impedance of the integrated circuit. By such an impedance matching, the power transfer between the integrated circuit and the folded dipole antenna is optimized. According to the invention, this impedance matching may be carried out without providing separate elements like loading-bars or stubs, but simply by adjusting the dimensions of the folded dipole antenna. This provides an integrated circuit designer with sufficient degrees of freedom and thus adjustment parameters, for an optimization of the impedance matching, without the need of additional elements. However, if desired in the case of a particular appliance, separate impedance matching elements like loading bars and/or stubs may be optionally implemented in the circuit array of the invention as well.

Preferably, the circuit array of the invention may be configured as a radio frequency identification tag (RFID tag). Possible exemplary application fields of such an RFID tag are electronic product security systems (anti-theft devices), applications in the automatization technique (for instance the automatic identification of vehicles in the frame of a toll system), access control systems (e.g. for employees of a company), cashless payment, skiing tickets, petrol station cards, animal tagging and application in libraries.

The circuit array of the invention may comprise at least one electronic member (electronic element, electronic device) at the disconnected portion which is adapted such that the at least one electronic member regulates the impedance of the folded dipole antenna such that the value of the impedance of the folded dipole antenna essentially equals the complex conjugate of the impedance of the integrated circuit. Thus, one or more variable and externally controllable electronic members may be provided and connected in the disconnected portion, e.g. a varactor diode, a pin diode (positive-intrinsic-negative diode), a MEM device (microelectromechanical device), a PMEM (piezoelectric MEM). By implementing one or more of such electronic members impedance matching may be further improved. Thus, an intelligent transponder chip (having a control output) may adjust optimum antenna impedance by itself. Such a device may regulate optimum antenna impedance and adapt such antenna impedance to (modified) conditions of the environment (e.g. a changed temperature). Thus, an improved performance of an RFID tag may be achieved.

In the following, preferred embodiments of the method of manufacturing a circuit array are described. These embodiments may also be applied for the circuit array of the invention.

Preferably, an integrated circuit is connected to the folded dipole antenna, the integrated circuit having a first integrated circuit connection that is connected to the first antenna connection, and having a second integrated circuit connection that is connected to the second antenna connection.

The material and/or the dimensions of the folded dipole antenna is/are configured such that a value of the impedance of the folded dipole antenna essentially equals to the complex conjugate of the impedance of the integrated circuit. This impedance matching results in an optimized electromagnetic energy coupling between the integrated circuit and the folded dipole antenna.

The value of the impedance of the folded dipole antenna may be essentially equal to the complex conjugate of the impedance of the integrated circuit by adjusting the width of the folded dipole antenna and/or by adjusting the length of at least a portion of the folded dipole antenna and/or by adjusting the distance between different portions of the folded dipole antenna. These geometry parameters have a significant influence to the impedance matching between the semiconductor chip and the folded dipole antenna.

The material and/or the dimensions of the substrate may, additionally or alternatively, be configured such that the value of the impedance of the folded dipole antenna essentially equals to the complex conjugate of the impedance of the integrated circuit. Thus, also by suitably selecting the material and the dimensions of the substrate, an impedance matching can be performed.

The several ways how the impedance matching may be achieved by the invention, can be very different:

According to one approach, the material and the geometry parameters may be chosen manually. Subsequently, a prototype of the transponder may be manufactured and tested experimentally. If the experiments are successful, the impedance matching parameters may be accepted. Otherwise, the cycle may be repeated with another set of parameters.

According to another approach a physical model is implemented to retrieve a geometry-based and material-based optimization of the impedance matching. For this purpose the influence of the geometry parameters and of the material parameters to the impedance are modelled. This model is translated into a computer program, and then standard methods are used to calculate an optimum set of parameters (e.g. using a least squares fit). Thus, the impedance matching according to the invention can be realized by means of a computer program, i.e. by software, or by using one or more special electronic optimization circuits, i.e. in hardware, or in hybrid form, i.e. by means of software components and hardware components.

Summarizing, the invention provides a novel antenna configuration especially suited for RFID applications ("radio frequency identification"), particularly in the frequency range above 800 MHz, further particularly for a passive RFID tag. According to the invented antenna design, the size of a transponder can be significantly reduced when compared to conventional transponders. Furthermore, sophisticated capacitive coupling mechanisms are implemented to prevent DC short-circuiting the transponder IC.

The aspects defined above and further aspects of the invention are apparent from the examples of embodiment to be described hereinafter and are explained with reference to these examples of embodiment.

BRIEF DESCRIPTION OF THE DRAWINGS

The invention will be described in more detail hereinafter with reference to examples of embodiment but to which the invention is not limited.

DESCRIPTION OF EMBODIMENTS

Figure 1:
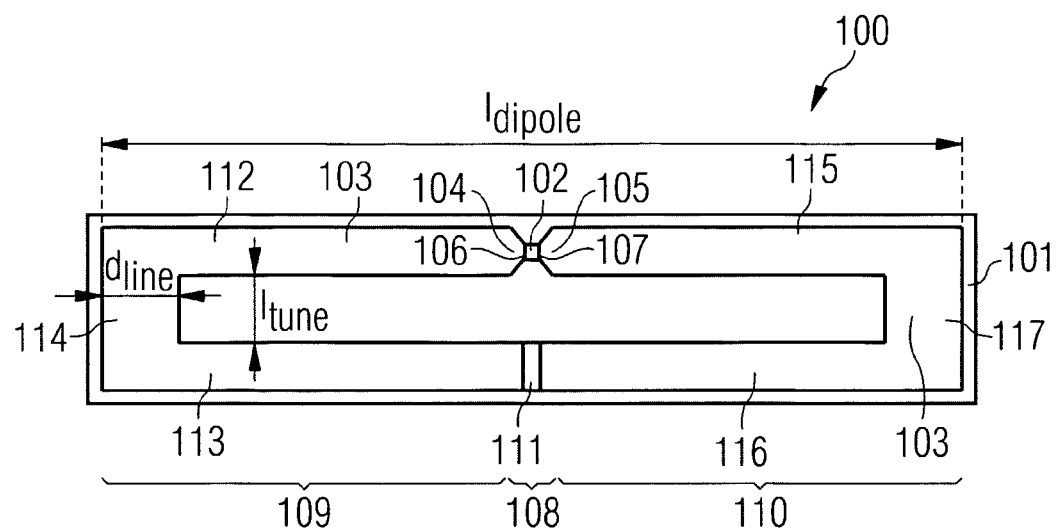
FIG. 1 shows a plan view of an RFID tag according to a first embodiment of the invention.

The illustration in the drawing is schematically. In different drawings, similar or identical elements are provided with the same reference signs.

In the following, referring to FIG. 1, an RFID tag 100 according to a first embodiment of the invention will be described in detail.

The RFID tag 100 comprises a plastics substrate 101 and an electrically conducting folded dipole antenna 103 arranged on the plastics substrate 101. The folded dipole antenna 103 has a first antenna connection 104 and has a second antenna connection 105. The RFID tag 100 further comprises a silicon chip 102 (i.e. an electronic chip made from a silicon wafer, the chip having an integrated circuit therein), wherein the silicon chip 102 is arranged on the plastics substrate 101. The silicon chip 102 has a first chip connection 106 connected to the first antenna connection 104 and has a second chip connection 107 connected to the second antenna connection 105. The folded dipole antenna 103 has a disconnected antenna portion 108 dividing the folded dipole antenna 103 in a first antenna portion 109 and in a second antenna portion 110 such that a capacity is formed as the disconnected antenna portion 108 between the first antenna portion 109 and the second antenna portion 110. In other words, the electrically conducting layer forming the folded dipole antenna 103 is interrupted mechanically, said interruption constituting the disconnected antenna portion 108.

The capacity is formed at the interruption of the electrically conducting material adjacent to the first antenna portion 109 and to the second antenna portion 110, wherein the ohmically disconnected antenna portion 108 is filled with dielectric material 111 between the first antenna portion 109 and the second antenna portion 110. This dielectric material 111 has a relative permittivity $\in_r > 1$ which increases the value of the capacity C, see equation (3), and further securely maintains the gap 108 between the first antenna portion 109 and the second antenna portion 110.

The disconnected portion 108 is provided at such a position of the folded dipole antenna 103 that the first antenna portion 109 is arranged symmetrically to the second antenna portion 110. Thus, the first antenna portion 109 is formed and arranged mirror-inverted with respect to the second antenna portion 110.

The silicon chip 102 comprises a rectifier sub-circuit (not shown in FIG. 1) which is adapted and connected such that the rectifier sub-circuit rectifies an alternating current flowing in the folded dipole antenna 103 in case of the absorption of electromagnetic waves, to provide a direct voltage for supplying integrated circuit members like an EEPROM (not shown in FIG. 1) of the silicon chip 102 with DC power. Moreover, the silicon chip 102 may have an interior ESD protection means ("electrostatic discharge"). Additionally, voltage multiplier means could be integrated in the IC 102.

The first antenna portion 109 and the second antenna portion 110 are both provided essentially U-shaped. Further, the first antenna portion 109 comprises a first leg piece 112, a second leg piece 113 and one link piece 114, wherein the first leg piece 112 is connected to the second leg piece 113 by the link piece 114. The first leg piece 112 is further connected to the first chip connection 106. The second antenna portion 110 comprises a first leg piece 115, a second leg piece 116 and a link piece 117, wherein the first leg piece 115 is connected to the second leg piece 117 by the link piece 116. The first leg piece 115 is further connected to the second chip connection 107. The second leg piece 113 of the first antenna portion 109 is separated from the second leg piece 116 of the second antenna portion 110 by the disconnected portion 108.

For a proper impedance matching between the impedance of the silicon chip 102 and the impedance of the folded dipole antenna 103, i.e. in order to fulfil equations (1), (2), the material of the folded dipole antenna 103 and the geometric parameters of the dipole antenna 103 are adjusted. For this purpose, the dipole length $l_{dipole}$, the tuning distance $l_{tune}$ and the line width $d_{line}$ of the electrically conducting structure constituting the folded dipole antenna 103 are adjusted accordingly. However, the impedance matching related to a proper selection of $d_{line}$ is preferably extended such that the line width of each of the portions of the electrically conducting structure (see FIG. 1: horizontal portions and vertical portions, linear portions and tapered portions) constituting the folded dipole antenna 103 may be adjusted separately.

Since a capacity is formed at the disconnected antenna portion 108, a DC short circuit of connections of the rectifier circuit within the silicon chip 102 is avoided, thus allowing a reliable supply of components of the silicon chip 102 with electrical power.

The folded dipole antenna 103 is made of an electrically conductive material, for instance copper (Cu), gold (Au), silver (Ag), aluminium (Al), an alloy comprising at least two of these materials, or of a superconductive material. The folded dipole antenna 103 is formed on the plastics substrate 101. Alternatively, the carrier substrate can also be made of any other synthetic material, of a ceramic, or of a synthetic material having ceramic particles embedded therein. Preferably, the material of the substrate 103 has a relative electrical permittivity $\in_r$ with a value significantly larger than one and/or a magnetic permeability $\mu_r$ having a value significantly larger than one. For instance, FR 4 may be used as a material for substrate 101 having a relative electrical permittivity $\in_r \approx 4.4$. "FR 4 laminate" is a base material from which a printed circuit board may be formed.

The folded dipole antenna 103 can be formed on the substrate 101 or can be alternatively formed embedded in the substrate 101 using a multi-layer technique. A material for forming the folded dipole antenna 103 can be provided by conventional methods including depositing such a material onto the substrate 101 or by adhering a conductive foil on the substrate 101. Such a layer of conductive material applied to the substrate 101 can then be patterned using conventional methods like etching, milling, screen processing or screen printing, or by embossing or using glue. Thus, material can be applied to the substrate 101 and can subsequently be patterned.

The silicon chip 102 is manufactured in CMOS technology. However, the chip 102 can alternatively be manufactured according to another technology (i.e. a germanium technology, a gallium arsenide technology). A typical size of the silicon chip 102 is 1 mm×1 mm×0.15 mm.

The maximum dimension (length) $l_{dipole}$ of the folded dipole antenna 103 depends on the operation frequency f of the RFID tag 100 and can be calculated in good approximation as follows:

$$l_{dipole} = c/(2\in_r^{1/2} f) \qquad (4)$$

In equation (4), c is the velocity of light in vacuum and $\in_r$ is the relative electrical permittivity of the substrate. Equation (4) can be derived from a resonance condition that the length of the folded dipole antenna $l_{dipole}$ should equal to half of the wavelength.

Since coupling mechanisms have an influence on the effective length, the chosen design can be optimized by corresponding experimental and/or simulative studies and can be adapted to frame conditions of a particular appliance. Moreover, in order to fulfil the complex conjugated matching condition the lengths as well as the widths of the metallic antenna structures are preferably adapted. A transponder with a folded dipole antenna 103 having dimensions of 65 mm in length and 12 mm in width can be fabricated on a FR 4 substrate having dimensions of 67 mm×15 mm×1 mm.

Besides the required operation frequency, the impedance of the antenna 103 is very important for the design of the RFID tag 100, since a suitable adjustment of the real part and of the imaginary part of the impedance allows to maximize the efficiency of the transponder 100. In the case of the folded dipole antenna 103 of the invention, the adjustment of the desired impedance is preferably achieved by setting antenna design parameters to proper values without the need to introduce separate impedance matching elements. In this context, it is very important to adjust the strength of the coupling between the two folded dipole sub-structures 109, 110. This coupling depends on the distance between metallization structures being aligned parallel to one another, i.e. depends on the tuning distance $l_{tune}$. The coupling further depends on the material and on the dimensions of the substrate 101.

For changing the impedance of the folded dipole antenna 103 in order to adapt this impedance to a required source impedance, several antenna parameters can be adjusted: one of these parameters is e.g. the width $d_{line}$ of the metallization. Additionally, the impedance matching concerning the width of the metallization structure may be extended such that the line widths of each of the portions of the metallization structure (horizontal portions and vertical portions, linear portions and tapered portions of the folded dipole antenna 103) are adjusted separately. Another important parameter is the tuning distance $l_{tune}$, i.e. the minimum distance between the first leg pieces 112, 115 and the second leg pieces 113, 116, compare FIG. 1. The adjustable parameters $d_{line}$, $l_{tune}$ are linked concerning their influence to the impedance of the folded dipole antenna, i.e. if one of these parameters is modified, then this has also an influence to the real part and the imaginary part of the impedance of the folded dipole antenna 103. However, by varying the metallization width $d_{line}$, the real part is stronger influenced than the imaginary part. In contrast to this, by reducing the tuning distance $l_{tune}$, the imaginary part is stronger influenced than the real part of the impedance of the folded dipole antenna 103.

Figure 2:
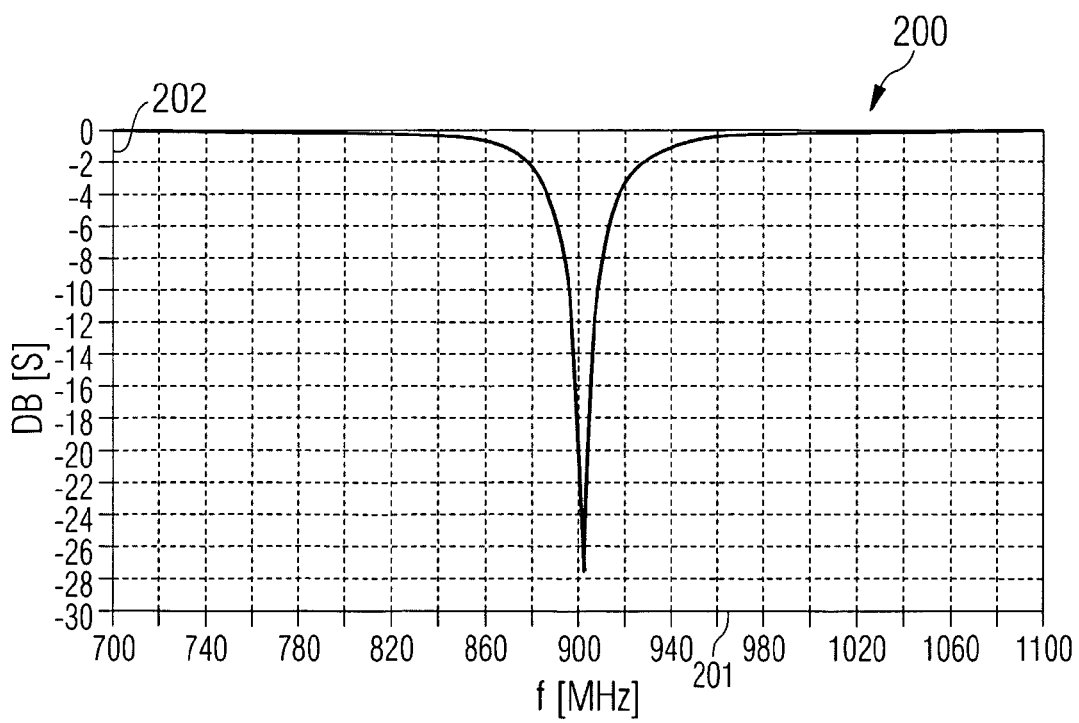
FIG. 2 shows a diagram illustrating the frequency dependence of a scatting parameter of the folded dipole antenna of the RFID tag according to the first embodiment of the invention.

FIG. 2 shows a diagram 200 having an abscissa 201 along which the operation frequency f is plotted in MHz, and having an ordinate 202 along which a scattering parameter $s_{11}$ is plotted in dB. In other words, FIG. 2 shows exemplary the scattering parameter $s_{11}$ of a transponder antenna designed according to the invention, for the RFID HF region.

It is noted that the imaginary part of the impedance of the folded dipole antenna 103 defines, besides the imaginary part of the source impedance $X_{source}$, also the resonance frequency. A resonance condition is fulfilled, if the reactances of the folded dipole antenna 103, $X_{antenna}$, and of the source, $X_{source}$, fulfil the following condition:

$$X_{antenna} = X_{source}^* \quad (5)$$

As one can see from equation (5), the reactance $X_{antenna}$ of the folded dipole antenna 103 should be complex conjugate to the reactance of the source $X_{source}$. Therefore, also the entire length of the $l_{dipole}$, influences the imaginary part of the antenna impedance.

In the following, referring to FIG. 3, an RFID tag 300 according to a second embodiment of the invention will be described.

Figure 3:
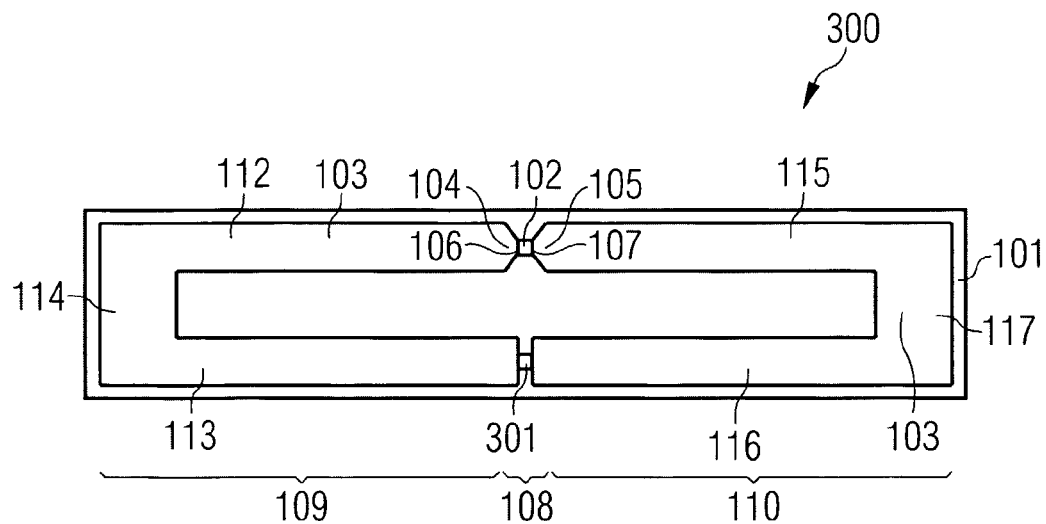
FIG. 3 shows a plan view of an RFID tag according to a second embodiment of the invention.

The RFID tag 300 shown in FIG. 3 differs from the RFID tag 100 shown in FIG. 1 in that the disconnected antenna portion 108 is not filled with dielectric material 111 in the case of the RFID tag 300. According to FIG. 3, the first antenna portion 109 is bridged to the second antenna portion 110 in the disconnected antenna portion 108 by providing an SMD capacitor element 301 ("surface mounted device"). Therefore, the RFID tag 300 comprises a capacitor device 301 arranged in the disconnected portion 108, wherein the capacitor member 301 has a first capacitor connection connected to the first antenna portion 109 and has a second capacitor connection connected to the second antenna portion 110.

Thus, FIG. 3 shows an embodiment of the invention in which a short circuit of the rectifier circuit in an input portion of the transponder chip 102 is avoided by means of the SMD capacitor element 301. This is realized by disconnecting the metallization structure of the folded dipole antenna 103 in the disconnected antenna portion 108 and by subsequently bridging said disconnected antenna portion 108 by the capacitor element 301. The capacitor 301 may be chosen to have a sufficiently high value of the capacity C and should have neglectable losses. Thus, a standard SMD capacitor 301 can be used, since such a device can be mounted in a cost effective manner. Alternatively, any other capacitor can be used (for instance a capacitor having axial (wire) connections).

The capacitor 301 itself forms a short circuit only for an alternating current alternating with a sufficiently high frequency (but does not form an ohmic short circuit), thus allows a data communication by a high frequency HF carrier signal. In contrast to this, the capacitor 301 suppresses a DC current flow between the two connections 106, 107 of the transponder IC 102.

As shown in FIG. 3, the position of the capacitor 303 is preferably symmetric with respect to the folded dipole antenna 103. However, the capacitor 301 can also be located at any other position within the metallization structure 103. Depending on the chosen position, it may be advantageous to adjust the design of the folded dipole antenna 103 to achieve a proper impedance matching.

Figure 4:
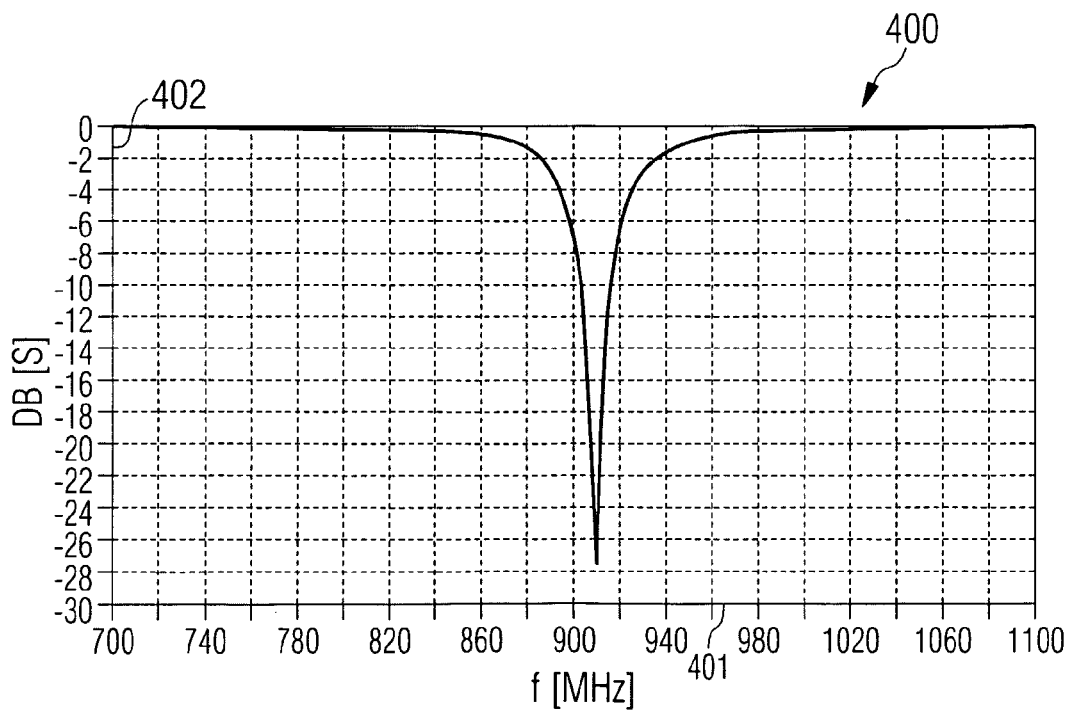
FIG. 4 shows a diagram illustrating the frequency dependence of a scatting parameter of the folded dipole antenna of the RFID tag according to the second embodiment of the invention.

Similarly to FIG. 2, FIG. 4 shows a diagram 400 having an abscissa 401 along which the operation frequency f is plotted in MHz, and having an ordinate 402 along which a scattering parameter $s_{11}$ is plotted in dB.

Thus, FIG. 4 shows exemplary the scattering parameter $s_{11}$ of the folded dipole antenna 103 in which the metallization has been disconnected in the manner as shown in FIG. 3 and has been bridged by means of the SMD capacity element 301.

Next, referring to FIG. 5, an RFID tag 500 according to a third embodiment of the invention will be described.

In the case of the RFID tag 500 a first antenna portion is formed by a first leg 112 and a second leg 501 and a link piece 114 and a second antenna portion is formed by a first leg 115 and a second leg 502 and a link piece 117.

Figure 5:
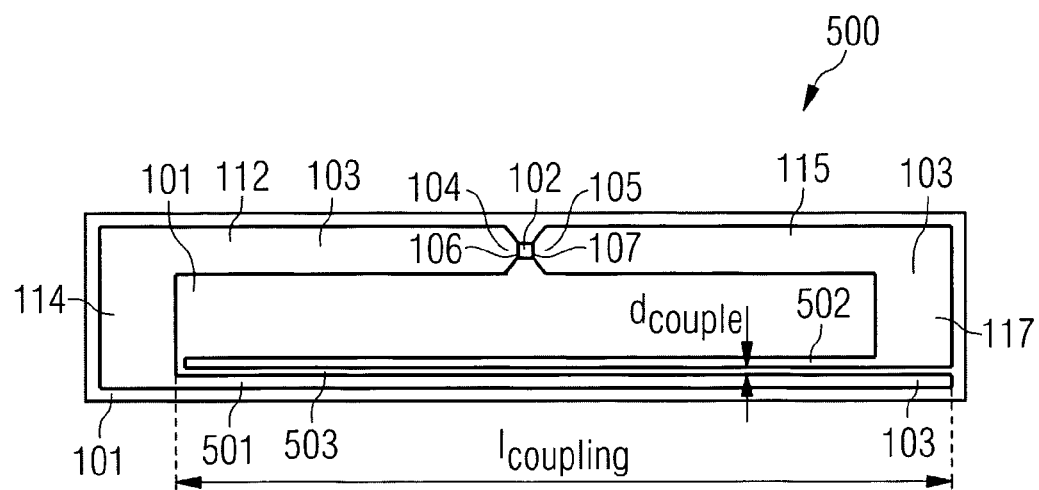
FIG. 5 shows a plan view of an RFID tag according to a third embodiment of the invention.

The RFID tag 500 shown in FIG. 5 differs from the RFID tag 100 shown in FIG. 1 in that no dielectric material 111 is provided between the second leg piece 501 of the first antenna portions and the second leg piece 502 of the second antenna portion in an area, in which the first and the second antenna portions are adjacent to one another. Further, in FIG. 1, the second legs 113, 116 have adjoining lines or areas, which are oriented perpendicular to alignment directions of the second legs 113, 116. In contrast to this, in FIG. 5, the adjoining lines or areas of the second leg pieces 501, 502 are aligned parallel to the alignment direction of the second leg pieces 501, 502. As one can gather from FIG. 5, a capacitive coupling length $l_{coupling}$ is significantly increased in the configuration of FIG. 5 compared to FIG. 1.

In the embodiment shown in FIG. 5, the capacitor 301 of FIG. 3 is substituted by the capacitive coupling structure 501, 502 which is integrated in the antenna design. The metallization of the folded dipole antenna 103 is disconnected at a disconnected antenna portion 503 to form two elongated conductive structures 501, 502 being oriented essentially parallel to one another and being arranged at a couple distance $d_{couple}$ from one another. The distance $d_{couple}$ between the two metallization structures 501, 502 and the length of the capacitive coupling distance $l_{coupling}$ essentially define the strength of the capacitive coupling. Also according to the embodiment of FIG. 5, a high frequency alternating voltage is transmitted without significant losses, and a direct voltage is blocked.

The capacitive coupling distance can be realized using different geometries, e.g. a linear capacitive coupling distance, a meander-like capacitive coupling distance or a spiral-like capacitive coupling distance. The capacitive coupling distance may be particularly defined by the relative alignment of end portions of the adjacent second leg pieces, and the antenna design can be adapted to the design of the coupling distance. It is also possible to provide a coupling distance having two (for example at the upper and at the lower main surface of the substrate 101) or more metallization structures in different layers (using common multi-layer techniques) of the carrier material.

Furthermore, the coupling can be modified—preferably enhanced—by providing a floating metallization particularly below the coupling distance.

Figure 6:
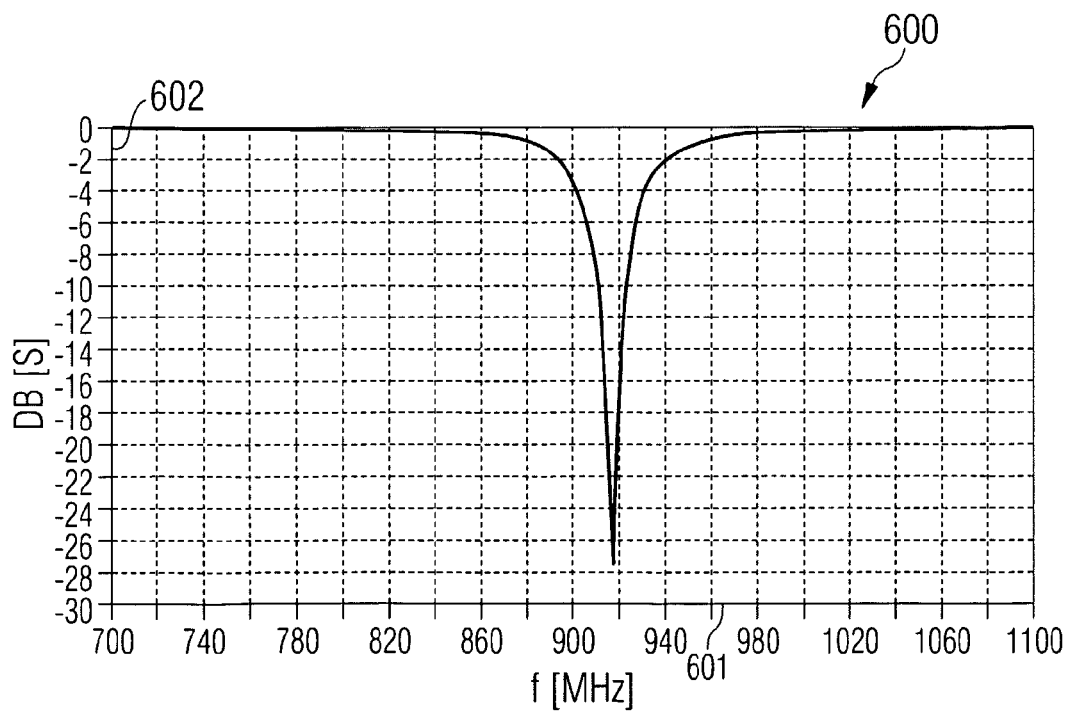
FIG. 6 shows a diagram illustrating the frequency dependence of a scatting parameter of the folded dipole antenna of the RFID tag according to the third embodiment of the invention.

Similarly to FIG. 2 and FIG. 4, FIG. 6 shows a diagram 600 having an abscissa 601 along which the operation frequency f is plotted in MHz, and having an ordinate 602 along which a scattering parameter $s_{11}$ is plotted in dB. Thus, FIG. 6 shows exemplary the scattering parameter $s_{11}$ of the folded dipole antenna 103 of FIG. 5 comprising the metallization structures 501, 502.

The embodiment of FIG. 5 has the advantage that no separate member (like an SMD capacitor 301) has to be mounted on the RFID tag 500. In contrast to this, the capacitive coupling is integrated within the antenna design. Thus, the manufacturing costs can be reduced and the error rate can be decreased.

In the following, referring to FIG. 7, a disconnected portion 700 of a circuit array according to an embodiment of the invention will be described.

Figure 7:
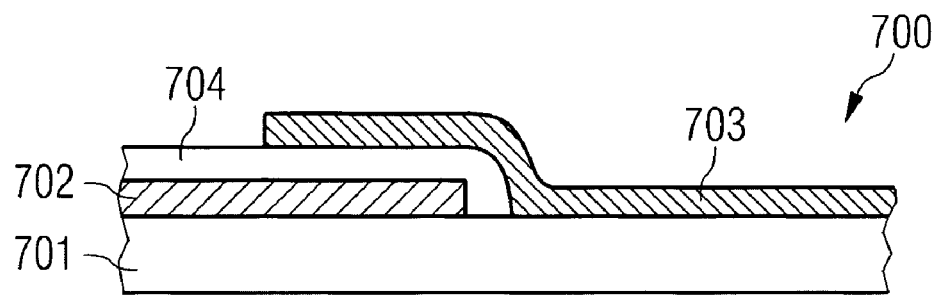
FIG. 7 shows a cross sectional view of a capacity portion of a circuit array according to the invention.

FIG. 7 shows a cross sectional view of a part of said circuit array of the invention, wherein a first antenna portion 702 of a folded dipole antenna is provided as a metallization layer deposited on a carrier substrate 701. The first antenna portion 702 is covered by a dielectric layer 704 having a relatively high value of the permittivity $\in_r$, thus forming a protection layer for the first antenna portion and simultaneously providing a capacitor dielectric for a capacitor to be formed in the following. On a part of the dielectric layer 704 and overlapping a part of the first antenna portion 702, a second antenna portion 703 is formed by depositing a layer of conductive material, thus completing a capacitor formed in the overlapping part of the layer sequence 702 to 704. According to FIG. 7, the first antenna portion 702, the dielectric layer 704 and the second antenna portion 703 overlap in a vertical direction.

Next, referring to FIG. 8, a disconnected portion 800 of a circuit array according to another embodiment of the invention will be described.

Figure 8:
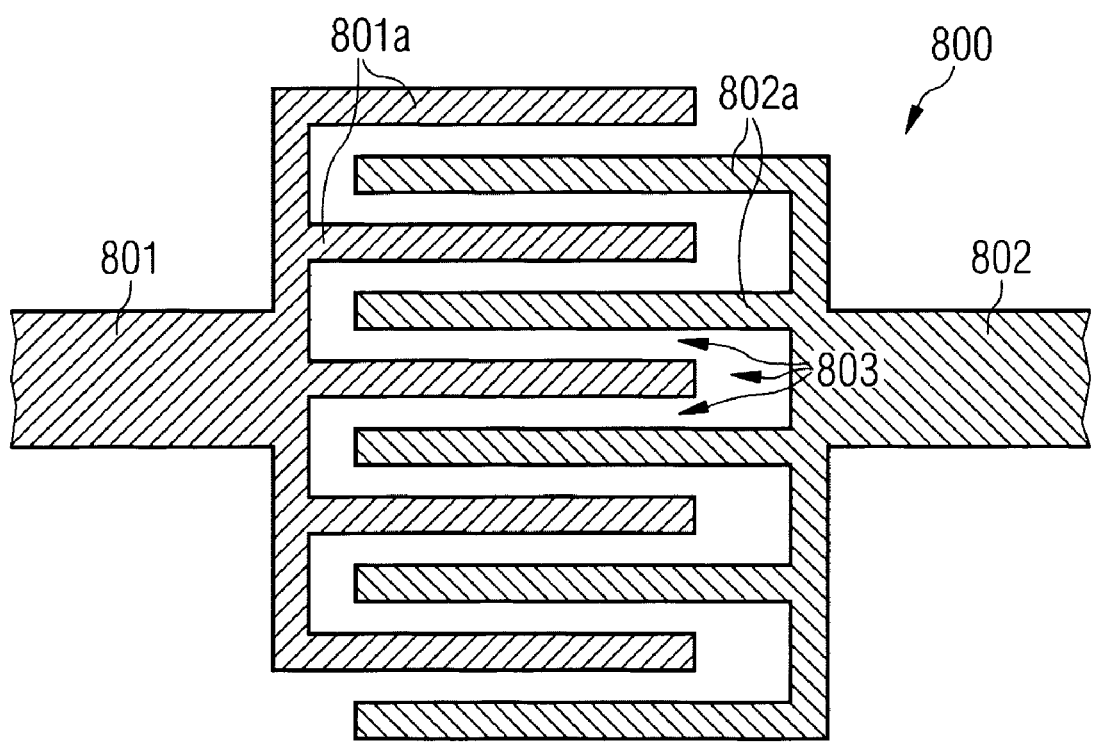
FIG. 8 shows a plan view of a capacity portion of a circuit array according to the invention.

In FIG. 8, a plan view of a disconnected portion 800 is shown in a region in which a first antenna portion 801 adjoins a second antenna portion 802, the first antenna portion 801 and the second antenna portion 802 constituting a folded dipole antenna of the circuit array of the invention. In this adjoining portion, the first antenna portion 801 has a plurality of first finger structures 801a, and the second antenna portion 802 has a plurality of second finger structures 802a. The first finger structures 801a and the second finger structures 802a are arranged to form an interdigitated structure, such that a meander-like capacitive coupling portion 803 is obtained. According to an alternative architecture of a meander-like capacitive coupling portion, the finger structures of the first and second antenna portion may be provided in a manner that they are aligned along a vertical direction of FIG. 8 to form an interdigitated structure. According to this alternative meander configuration, the first and second antenna portions are essentially aligned along a horizontal direction of FIG. 8. Thus, a meander-like coupling structure may extend along the entire length of the capacitive coupling distance $l_{coupling}$.

In the following, referring to FIG. 9, a disconnected portion 900 of a folded dipole antenna of a circuit array according to another embodiment of the invention is described.

Figure 9:
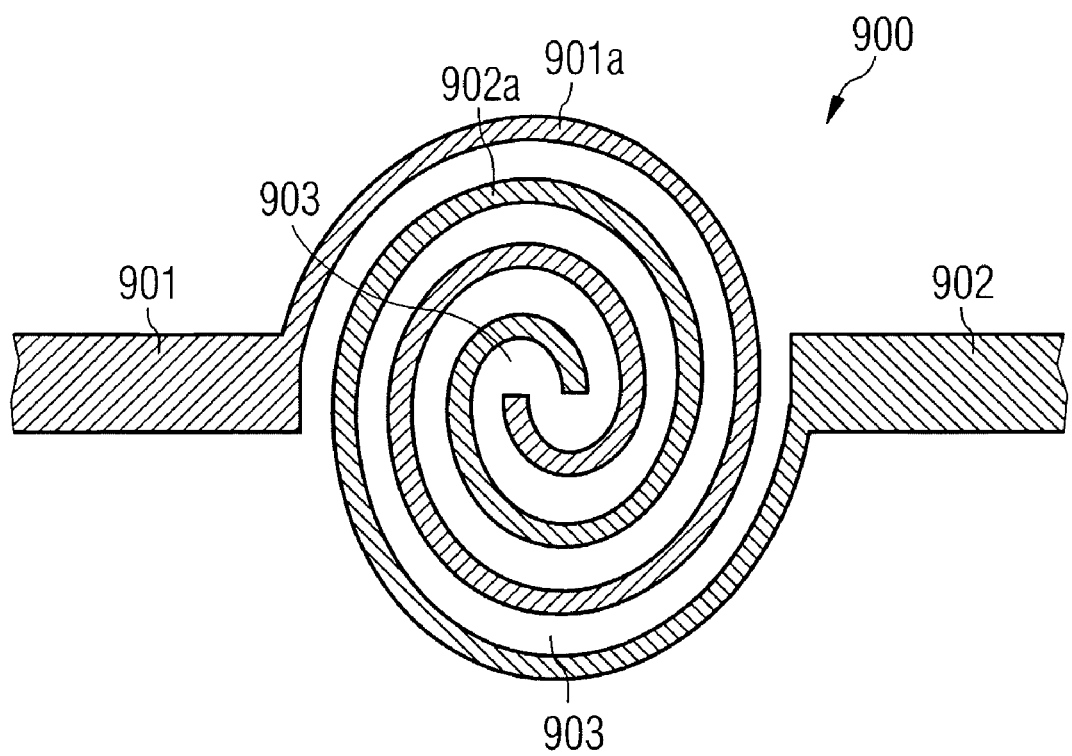
FIG. 9 shows a plan view of a capacity portion of a circuit array according to the invention.

As shown in the plan view of FIG. 9, a disconnected portion 900 has a first antenna portion 901 and has a second antenna portion 902. The first antenna portion 901 and the second antenna portion 902 are forming a disconnected folded dipole antenna. At an end portion of the first antenna portion 901, a first spiral structure 901a is shown. Further, at an end portion of the second antenna portion 902, a second spiral structure 902a is shown. The first spiral structure 901a and the second spiral structure 902a are capacitively coupled in such a manner that a spiral-like capacitive coupling portion 903 for capacitively coupling the first antenna portion 901 to the second antenna portion 902 is provided.

Summarizing, the invention discloses a novel antenna configuration particularly suitable for use in RFID ("radio frequency identification") appliances in the high frequency region above 800 MHz. A folded dipole structure allows reducing the dimensions of conventional transponders, whereas the electrical performance is maintained or even improved. By capacitive couple mechanisms, a DC short circuit of a semiconductor rectifier is avoided. A universal implementation of the antenna design is enabled.

In the following, it will be described in more detail, how changes of the coupling properties of the metallization structures forming the folded dipole antenna influence the properties of the antenna input impedance. In this respect it is distinguished between a modification of the capacitive coupling distance $l_{coupling}$ and a modification of the couple distance $d_{couple}$, compare FIG. 5. More generally, the capacitive coupling distance $l_{coupling}$ is the length along which the folded dipole antenna portions are facing each other at the disconnected portion, thus influencing parameter A in equation (3). Moreover, the couple distance $d_{couple}$ is the distance between the adjacent folded dipole antenna portions at the disconnected portion, i.e. a length of the disconnected portion, thus influencing parameter d in equation (3).

Figure 10:
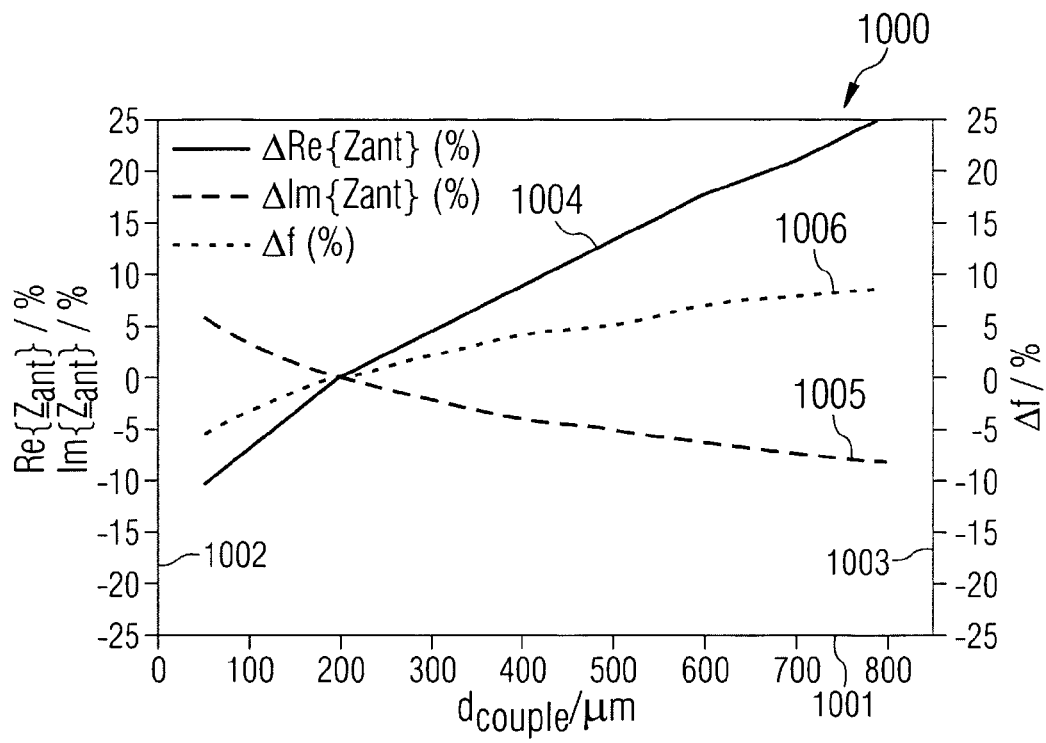
FIG. 10 shows a diagram illustrating the real- and imaginary part of the input impedance of a folded dipole antenna and the frequency, each as a function of the distance between the first antenna portion and the second antenna portion at the disconnected portion.

Referring to FIG. 10, a diagram 1000 will be explained which illustrates how a shift $\Delta f$ of the resonance frequency, how the real part Re{$\underline{Z}$ant} of the impedance and how the imaginary part Im{$\underline{Z}$ant} of the impedance of a folded dipole antenna depend on the distance $d_{couple}$ between the first antenna portion and the second antenna portion at the disconnected portion.

FIG. 10 shows the diagram 1000 having an abscissa 1001 along which the distance $d_{couple}$ is plotted in μm, having a first ordinate 1002 along which the relative change of the real part Re{$\underline{Z}$ant} of the impedance and the relative change of the imaginary part Im{$\underline{Z}$ant} of the impedance of a folded dipole antenna is plotted in percent (%), and having a second ordinate 1003 along which a frequency shift $\Delta f$ is plotted in percent (%). A first curve 1004 shows the change $\Delta$Re{$\underline{Z}$ant} of the real part of the impedance in percent (%), when the distance $d_{couple}$ is varied. A second curve 1005 shows the change $\Delta$Im{$\underline{Z}$ant} of the imaginary part of the impedance in percent (%), when the distance $d_{couple}$ is varied. A third curve 1006 shows the change $\Delta f$ of the resonance frequency of the folded dipole antenna in percent (%), when the distance $d_{couple}$ is varied.

In other words, FIG. 10 illustrates a relative change of the input impedance of the antenna and a relative shift of the resonance frequency of the antenna with reference to a "reference design". This "reference design" is chosen such (ratio of length and width of the electrically conductive structure forming the folded dipole antenna) that a resonance frequency of $f_c$=918 MHz results at a distance $d_{couple}$=200 μm. The complex chip impedance to which the impedance of the antenna is matched, is −28 dB (see FIG. 6).

As one can gather from FIG. 10, the real part Re{$\underline{Z}$ant} of the input impedance of the antenna increases significantly with increasing distance $d_{couple}$. In contrast to this, the imaginary part Im{$\underline{Z}$ant} of the input impedance of the antenna decreases with increasing distance $d_{couple}$, wherein the absolute value of the slope of curve 1005 has the tendency to be less than the absolute value of the slope of curve 1004. As a consequence (see third curve 1006), the change of the resonance frequency of the folded dipole antenna, when the distance $d_{couple}$ is varied, is relatively low (analogue to the second curve 1005).

According to the invention, the real part and the imaginary part of the impedance of the antenna may be adjusted by varying, as design parameters, the length and the width of the metallization structure constituting the folded dipole antenna.

Figure 11:
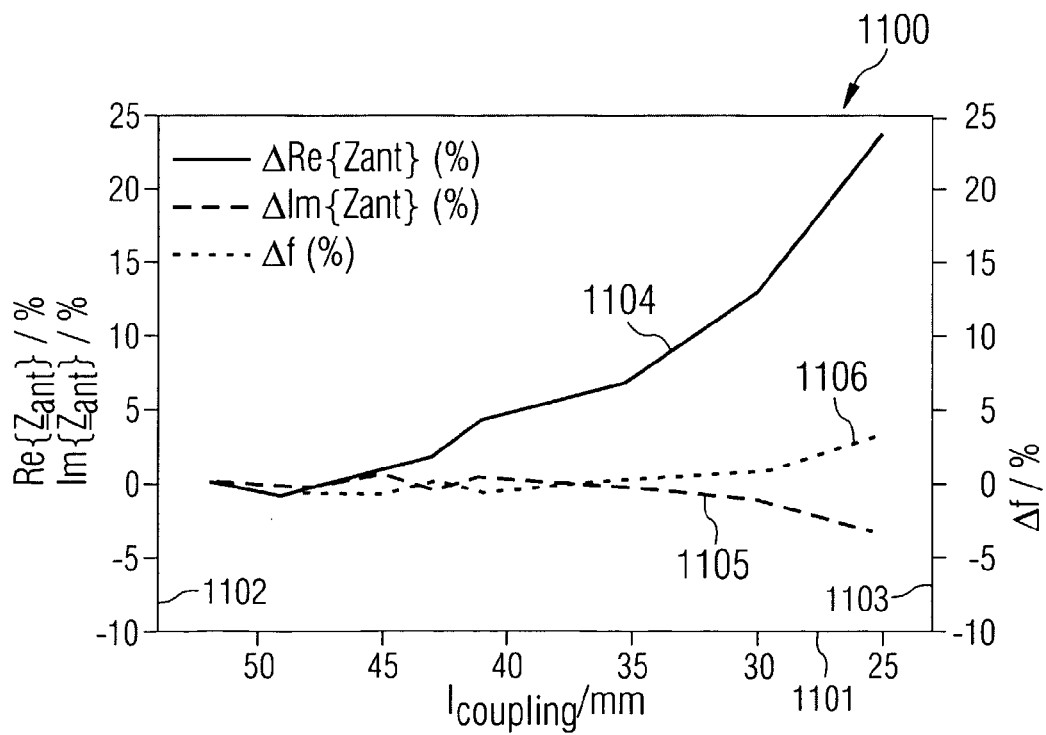
FIG. 11 shows a diagram illustrating the real and imaginary part of the impedance of a folded dipole antenna and the frequency, each as a function of the length along which the first antenna portion faces the second antenna portion at the disconnected portion.

Referring to FIG. 11, a diagram 1100 will be explained which illustrates how a shift $\Delta f$ of the resonance frequency, how the real part Re{$\underline{Z}$ant} of the impedance and how the imaginary part Im{$\underline{Z}$ant} of the impedance of a folded dipole antenna depend on the value of the capacitive coupling distance $l_{coupling}$.

FIG. 11 shows the diagram 1100 having an abscissa 1101 along which the capacitive coupling distance $l_{coupling}$ is plotted in mm, having a first ordinate 1102 along which the relative change of the real part Re{$\underline{Z}$ant} of the impedance and the relative change of the imaginary part Im{$\underline{Z}$ant} of the impedance of a folded dipole antenna is plotted in percent (%), and having a second ordinate 1103 along which a frequency shift $\Delta f$ is plotted in percent (%). A first curve 1104 shows the change $\Delta$Re{$\underline{Z}$ant} of the real part of the impedance in percent (%), when the capacitive coupling distance $l_{coupling}$ is varied. A second curve 1105 shows the change $\Delta$Im{$\underline{Z}$ant} of the imaginary part of the impedance in percent (%), when the capacitive coupling distance $l_{coupling}$ is varied. A third curve 1106 shows the change $\Delta f$ of the resonance frequency of the folded dipole antenna in %, when the capacitive coupling distance $l_{coupling}$ is varied.

Thus, a method of adjusting the capacitive coupling introduced a modification of the capacitive coupling distance $l_{coupling}$. FIG. 11 illustrates a relative change of the input impedance of the antenna and a relative shift of the resonance frequency of the antenna with reference to the "reference design" described above referring to FIG. 10.

As can be seen from FIG. 11, a change of the capacitive coupling distance $l_{coupling}$ has a very strong influence to the value and also to the curve shape of the first curve 1104. In other words, the real part Re{$\underline{Z}$ant} of the impedance is very sensitive to a variation of the capacitive coupling distance $l_{coupling}$. The tendency is that the real part Re{$\underline{Z}$ant} of the impedance increases with a decreasing capacitive coupling distance $l_{coupling}$. The imaginary part Im{$\underline{Z}$ant} of the impedance and thus the resonance frequency f of the antenna (which is correlated with Im{$\underline{Z}$ant}) show a weaker dependence (e.g. a factor of 8) from the capacitive coupling distance $l_{coupling}$.

It turned out that a reduction of the capacitive coupling results in a significant increase of the real part of the impedance, whereas the imaginary part of the impedance decreases only slightly. In this context, a modification of the capacitive coupling distance $l_{coupling}$ has a stronger (e.g. a factor of 3) influence than a modification of the distance $d_{couple}$.

The structure of the capacitive coupling, i.e. the geometry of the dipole portions in the vicinity of the disconnected portion can be designed in various manners. Such a structure may be non-linear (e.g. meander-like, curved) or linear. The structures may be provided in different layers, e.g. on a top surface and on a bottom surface of the substrate, and may include through holes in the substrate filled with conductive material.

The invention claimed is:

1. A circuit array, comprising:
a substrate;
an electrically conducting folded dipole antenna arranged on and/or in the substrate, the folded dipole antenna having a first antenna connection and having a second antenna connection;
wherein the folded dipole antenna has a disconnected portion dividing the folded dipole antenna in a first antenna portion and in a second antenna portion such that a capacity is formed at the disconnected portion between the first antenna portion and the second antenna portion;
an integrated circuit arranged on and/or in the substrate and connected to the folded dipole antenna;
wherein the material and/or the dimensions of the folded dipole antenna is/are configured such that the value of the impedance of the folded dipole antenna essentially equals the complex conjugate of the impedance of the integrated circuit; and
at least one electronic member at the disconnected portion adapted such that the at least one electronic member regulates the impedance of the folded dipole antenna such that the value of the impedance of the folded dipole antenna is adapted to a change in an environmental condition so that the value of the impedance of the folded dipole antenna essentially equals the complex conjugate of the impedance of the integrated circuit.

2. The circuit array according to claim 1, comprising dielectric material between the first antenna portion and the second antenna portion.

3. The circuit array according to claim 1, comprising a capacitor device arranged in the disconnected portion the capacitor device having a first capacitor connection connected to the first antenna portion and having a second capacitor connection connected to the second antenna portion.

4. The circuit array according to claim 1, wherein the capacity is formed in a portion in which the first antenna portion overlaps the second antenna portion being arranged at a distance from one another.

5. The circuit array according to claim 4, wherein the first antenna portion overlaps the second antenna portion in a plane parallel to a main surface of the substrate.

6. The circuit array according to claim 5, wherein the disconnected portion essentially has the shape of a line or a meander or a spiral.

7. The circuit array according to claim 6, having a floating structure made of an electrically conducting material arranged above or below the disconnected portion.

8. The circuit array according to claim 7, wherein the disconnected portion is provided at such a position of the folded dipole antenna that the first antenna portion is arranged symmetrically to the second antenna portion.

9. The circuit array according to claim 8, wherein the first antenna portion is provided U-shaped, and wherein the second antenna portion is provided U-shaped.

10. The circuit array according to claim 1, the integrated circuit having a first integrated circuit connection connected to the first antenna connection and having a second integrated circuit connection connected to the second antenna connection.

11. The circuit array according to claim 10, wherein the integrated circuit comprises a rectifier sub-circuit adapted and connected such that the rectifier sub-circuit rectifies an alternating voltage provided in the folded dipole antenna to generate a direct voltage.

12. The circuit array according to claim 11, wherein the first antenna portion comprises a first leg piece and a second leg piece and one link piece, wherein the first leg piece is connected to the second leg piece by the link piece wherein the first leg piece is further connected to the first integrated circuit connection, wherein the second antenna portion comprises a first leg piece and a second leg piece and one link piece wherein the first leg piece is connected to the second leg piece by the link piece wherein the first leg piece is further connected to the second integrated circuit connection, wherein the second leg piece of the first antenna portion is separated from the second leg piece of the second antenna portion by the disconnected portion.

13. The circuit array according to claim 12, wherein the first and second leg pieces of the first and second antenna portions are aligned in a first direction being perpendicular to a second direction along which the link pieces of the first and second antenna portions are aligned.

14. The circuit array according to claim 13, configured as a radio frequency identification tag.

15. The circuit array according to claim 1, wherein the first antenna portion overlaps the second antenna portion such that the disconnected portion is located above an overlapping part of the first antenna portion and below an overlapping part of the second antenna portion in a vertical stack of layers that is separated by a dielectric layer that is located between the overlapping parts.

16. The circuit array according to claim 1, wherein the electronic member is a varactor diode.

17. The circuit array according to claim 1, wherein the electronic member is a positive-intrinsic-negative (pin) diode.

18. The circuit array according to claim 1, wherein the electronic member is a microelectromechanical (MEM) device.

19. The circuit array according to claim 1, wherein the electronic member is a piezoelectric microelectromechanical (PMEM) device.

20. The circuit array according to claim 1, wherein the electronic member is configured to adapt the impedance of the folded dipole antenna in response to a change in temperature.

21. The circuit array according to claim 1, wherein the electronic member regulates optimum antenna impedance and adapts antenna impedance in response to a change in temperature.

* * * * *